United States Patent [19]
Soo

[11] Patent Number: 5,548,206
[45] Date of Patent: Aug. 20, 1996

[54] SYSTEM AND METHOD FOR DUAL MODE DC-DC POWER CONVERSION

[75] Inventor: David H. Soo, Sunnyvale, Calif.

[73] Assignee: National Semiconductor Corporation, Santa Clara, Calif.

[21] Appl. No.: 130,092

[22] Filed: Sep. 30, 1993

[51] Int. Cl.⁶ ......................................... G05F 1/40
[52] U.S. Cl. ........................................ 323/284; 323/224
[58] Field of Search .................... 323/283, 284, 323/285, 288, 224; 307/270, 481, 433; 326/21; 363/41, 65

[56] References Cited

U.S. PATENT DOCUMENTS

| | | | |
|---|---|---|---|
| 5,028,861 | 7/1991 | Pace et al. | |
| 5,095,224 | 3/1992 | Renger | 307/270 |
| 5,192,906 | 3/1993 | Nathan | 323/284 |
| 5,283,726 | 2/1994 | Wilkerson | 363/41 |
| 5,426,388 | 6/1995 | Flora et al. | 327/110 |

FOREIGN PATENT DOCUMENTS

| | | |
|---|---|---|
| WO86/04189 | 7/1986 | European Pat. Off. |
| WO91/00564 | 1/1991 | European Pat. Off. |
| WO86/604189 | 7/1986 | WIPO |

OTHER PUBLICATIONS

Linear Technology Corporation, "High Efficiency Synchronous Step–Down Switching Regulators", LTC1148/LTC1148–3.3/LTC1148–5, p. 1–20, 1993.

*Primary Examiner*—Peter S. Wong
*Assistant Examiner*—Bao Q. Vu
*Attorney, Agent, or Firm*—Limbach & Limbach L.L.P.

[57] ABSTRACT

A dual-mode power saving dc-dc converter. The dual-mode power saving dc-dc converter has a first switch control circuit and a second switch control circuit. The first switch control circuit is connected to a first current sensor, and the second switch control circuit is connected to a second current sensor. The two current sensors are connected to a control logic, which is operable to enable and disable the first and second switch control circuit. The first switch control circuit uses less power than the second switch control circuit. The control logic activates the first switch control circuit during low current load and activates the second switch control circuit used during high current load. Other systems and methods are disclosed.

30 Claims, 6 Drawing Sheets

SYSTEM AND METHOD FOR DUAL MODE DC-DC POWER CONVERSION

FIELD OF THE INVENTION

This invention relates generally to power supplies for battery operated devices, and in particular, to a dual-mode dc-dc power converter that utilizes two distinct switch control circuit systems for switching between power conversion modes.

BACKGROUND OF THE INVENTION

Battery operated electronic devices, such as lap-top computers, cellular telephones, calculators, etc., require conversion from the voltage output by the batteries powering the devices to a voltage required by the circuitry of the devices. Typically, a rechargeable battery produces a 1.5v voltage. In some applications, several batteries are connected in series, thereby increasing the voltage output from 1.5 to higher voltages such as 6 to 12 volts. However, most integrated circuits, which make-up large portions of battery operated electronic devices, require a voltage supply of either 5.0 volts or 3.3 volts. Thus, the voltage produced by the battery must be converted to the voltage requirements of the device circuitry.

Figure 2A:
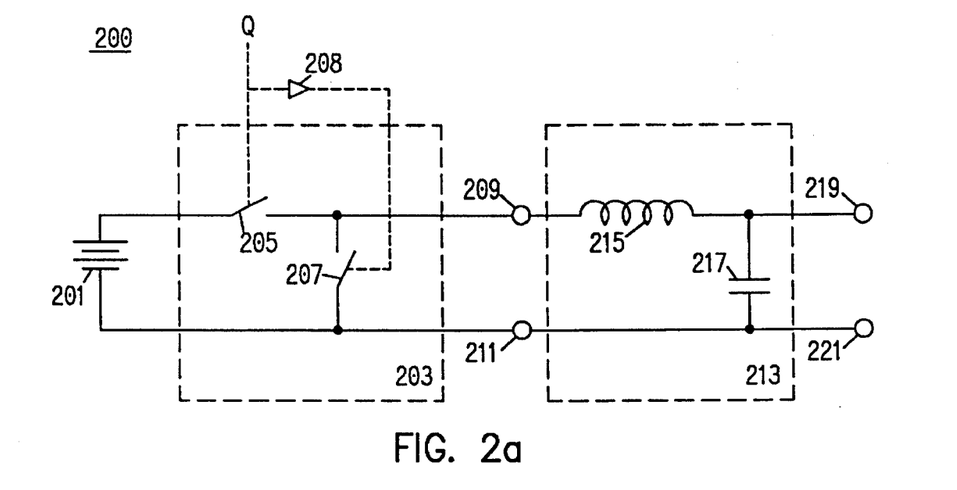
FIG. 2(a) is a schematic of pulse-width modulation switching regulator dc-dc power converter.

Switching regulators provide one mode of dc-dc power conversion. FIG. 2(a) is a simplified schematic showing a switching regulator. A switching regulator may be viewed as an inverter circuit connected to a low-pass filter composed of an inductor and a capacitor. The inverter circuit produces a square wave voltage waveform having on-time during pulses and off-time between pulses. The low-pass filter smoothes the waveform, thereby producing a nearly constant level dc-voltage. During on-time the capacitor charges and it discharges during off-time. The voltage level is regulated in the switching regulator by controlling the duration and frequency of the voltage pulses produced by the switching network, i.e., by controlling the on-time versus the off-time. The ratio of on-time versus the total time for both on-time and off-time is referred to as the duty cycle. By lowering the duty cycle the voltage is lowered because the charge-up time for the capacitor is shortened and the discharge-time is lengthened. Conversely, by increasing the duty cycle the voltage is increased because the charge-up time is lengthened and the discharge-time is shortened.

One form of switching regulator uses transistors as the switches in the inverter network. The switches are turned on and off by providing a current or a voltage to the transistors' gates. The frequency with which the transistor is turned on and off is controlled by a pulse-width modulator (PWM). Such controllers are referred to as PWM controllers. An example of a PWM controller is the LM1575 family of voltage regulators available from National Semiconductor Corporation of Santa Clara, Calif.

The value of a portable device is proportional to the duration of the device's battery life. Thus, it is very important to minimize the power consumption of the device. A number of techniques have been implemented to reduce the power consumption and, thereby, prolonging the battery life of portable devices. For portable computers, such techniques include shutting down the display and/or the micro-processor during idle times. While the display and micro-processor are significant sources of power consumption, the power supply also consumes a considerable amount of power.

In a switching regulator, during low loads, the power consumption may be reduced by decreasing the duty cycle. However, there is still a relatively high power consumption in the switching network due to the capacitance in the transistors and to bias current. Bias current is the current required to keep the circuitry active. The bias current is the current that is required by the transistor inverter network even when the circuit is not switching.

U.S. Pat. No. 5,028,861 to Pace et al. describes one method of reducing the power consumption due to a dc-dc converter power supply. This method consists of a regulating means whereby the power conversion is turned on and off depending on the output voltage. When the output voltage has increased above a predetermined threshold, the converter is shut off, thereby, allowing the capacitor to discharge to a lower limit. At this lower limit, the power conversion is reactivated, thereby allowing the capacitor to charge. The alteration between turning the power conversion on and off causes a relatively large ripple voltage during high current load as well as during low current load. Having a large ripple voltage is disadvantageous because it places a larger filtering burden on the functional circuitry of the device.

Furthermore, during low loads, the technique described in U.S. Pat. No. 5,028,861 is relatively inefficient because, even during low loads, the power conversion is turned on and off, thus requiring voltage to be applied to the gating transistors and to the bias circuitry.

Furthermore, the output voltage waveform produced by the controller described in U.S. Pat. No. 5,028,861 is of variable frequency at all times.

Another power saving technique is exemplified by the LTC1148 family available from switching-regulator controllers of Linear Technology Corp., of Milpitas, Calif. During high current load, the LTC1148 exhibits the behavior of a PWM controller. During low loads, the LTC1148 allows the output voltage to drift out of regulation towards an upper limit. At this stage, the LTC1148 resembles the controller described in U.S. Pat. No. 5,028,861, in that, at the upper limit, the power conversion is shut-down and the capacitor is allowed to discharge until the output voltage has dropped to the lower limit. When the output voltage has dropped below the lower limit, the LTC1148 returns to PWM mode, i.e., it controls the power conversion by turning on and off the voltage to the gates of the switching transistors. Thus, the LTC1148 is inefficient during low current load operations because it turns on and off the gate voltage of the switching transistors.

The LTC1148 relies on an external sensing resistor for sensing current flow through the switching circuitry. The resistor is a further cause of power consumption during both low and high loads. Additionally, when the input voltage changes, the LTC1148 changes the switching frequency, which places a larger noise filtering burden on the circuitry.

It is therefore desirable to provide a system and method for dc-dc power conversion that conserves power during low loads and yet overcomes the problems described above with reference to the prior art.

SUMMARY OF THE INVENTION

It is an object of the present invention to extend the battery life of battery operated electronic devices.

It is a further object of the present invention to provide for power savings during light current loads on a power supply.

It is a further object of the present invention to provide on-chip sensing of the current load on a power supply.

It is a further object of the present invention to use the on-chip sensing of the current load to select between a high current load power conversion circuit and a low load power conversion circuit.

It is a further object of the present invention to provide dual mode dc-dc power conversion for battery operated devices.

It is a further object of the present invention to provide a low output ripple voltage during high current loads.

It is a further object of the present invention to provide a constant frequency of pulse-width modulation switching during high current loads.

It is a further object of the present invention to provide a straight line upcharge during power saving mode.

It is a further object of the present invention to provide automatic selection between a high current load power conversion circuit and a low current load power conversion circuit.

It is a further object of the present invention to completely turn off pulse-width modulation power conversion during light loads.

It is a further object of the present invention to provide a low load dc-dc power conversion scheme that is independent of the high current load mode dc-dc power conversion scheme.

It is a further object of the present invention to provide external means for adjusting the thresholds for selecting between the high current load power conversion circuit and the low current load power conversion circuit.

According to the invention, there is provided a power saving dc-dc converter that includes two switch control circuit systems. The first switch control circuit uses less power than the second switch control circuit. A first current sensor is connected to the first switch control circuit and a second current sensor is connected to the second switch control circuit. Control logic connected to the two current sensors operates to enable and disable the first and second switch control circuits such that the first switch control circuit is enabled during low current load and the second switch control circuit is enable during high current load.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

Figure 1:
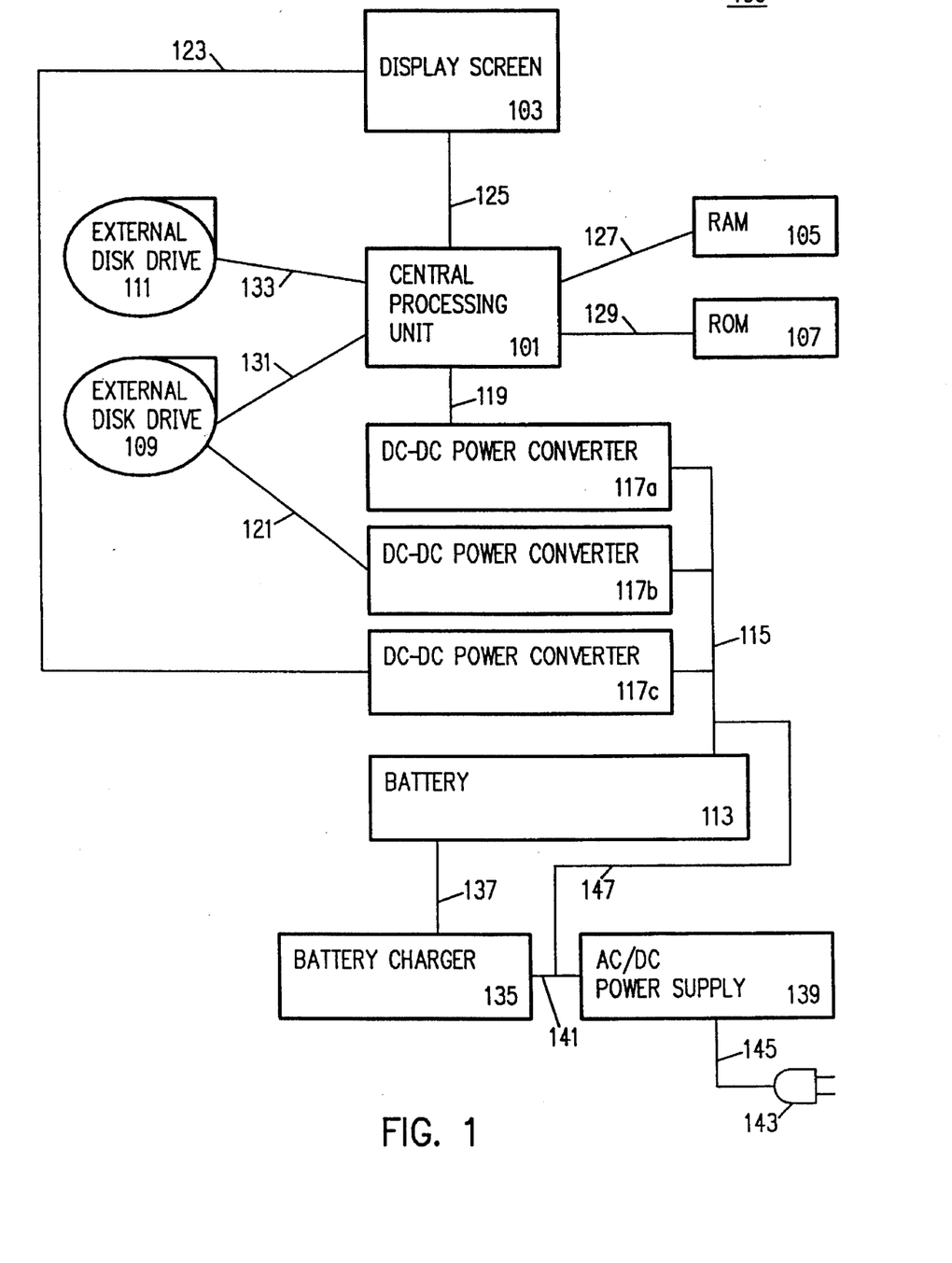
FIG. 1 is a schematic of the architecture for a lap-top computer.

FIG. 1 is a block diagram of a lap-top computer 100. While the present invention is described in the context of lap-top computers, a person skilled in the art will recognize many other applications for the present invention, e.g., cellular telephones, pagers, electronic calculators, portable database devices, global-positioning satellite (GPS) systems, and other battery operated electronic devices.

The lap-top computer 100 consists of a central processing unit 101 connected to a display screen 103, a random access memory (RAM) 105, a read only memory 107, an external disk drive 109 and an internal disk drive 111. The lap-top computer 100 is powered by a battery 113. Battery 113 may be a rechargeable nickel-cadmium (ni-cad) battery consisting of one or more cells each producing approximately 1.5 volts. By connecting several ni-cad cells in series the battery 113 may produce any of a large number of voltages, e.g., 1.5, 3.0, 4.5, 6, 9, and 12. Furthermore, during the operation of lap-top computer 100, the power consumed by the lap-top computer 100, causes the voltage output from the battery to vary over a certain range. As an example, in one embodiment battery 113 consists of eight ni-cad cells connected in series, which produce a combined voltage in the range of 0 to 12 volts, wherein 0 volts represents a completely drained battery and 12 volts a fully charged battery. The output voltage from the battery 113 is made available through power wires 115.

The central processing unit 101, the external disk drive 109, and the display screen 103 each operate on voltages that may be different from one another and from the output voltage from the battery 113. The output voltage on power wire 115 is converted by dc-dc power converters 117a through 117c to the voltages needed by the central processing unit 101, the external disk drive 109, and the display screen 103, respectively. Each of the dc-dc power converters 117a through 117c may be a power converter according the present invention as described below in conjunction with FIG. 3.

The output from the battery 113 may be in varying range, e.g., from 0 to 12 volts. The output voltages from the dc-dc converters 117a through 117c are each relatively stable, thus providing the voltage required by the devices that they power, respectively. Typically, integrated circuits such as central processing unit 101 operate at a voltage of either 3.3 volts or 5.5 volts. Other voltages, e.g., 2.0 volts, are also possible. Thus, the output voltage on the power wire 119 connecting the dc-dc converter 117a with the central processing unit 101 is a stable voltage corresponding to the voltage requirements of the central processing unit 101. Similarly, the output voltages on power wires 121 and 123, connecting the dc-dc converter 117b with the external disk drive 109 and the dc-dc converter 117c with the display screen 103, respectively, correspond to the voltage requirements of the external disk drive 109 and the display screen 103, respectively.

The central processing unit provides data and control signals to display screen 103 via wires 125. The central processing unit provides data and control signals to the external disk drive 109 through wires 131. The central processing unit 101 provides data, control and power to the RAM 105, the ROM 107, and the internal disk drive 111, through wires 127, 129, and 133, respectively.

The battery 113 is recharged by a battery charger 135 through wires 137. The battery charger 135 is connected to an AC/DC power supply 139 via wires 141. The AC/DC power supply is connected to an AC voltage source by connector 143 and wires 145. The AC voltage source may, for example, be a household or office electric outlet providing 120 volts AC. The output from the AC/DC power supply 139 is for example, 7.5 volts DC. The DC output from the AC/DC power supply 139 is also provided directly to dc-dc power converters 117a through 117c via wires 147.

FIG. 2(a) is a simplified schematic of a pulse-width modulation switching regulator dc-dc power converter 200. The pulse-width modulation switching regulator consists of a dc power source 201. The dc power source 201 is, for example, a battery consisting of a number of serially connected ni-cad cells. The dc power source 201 is connected to an inverting network 203 consisting of two inverting switches 205 and 207. The switches 205 and 207 are, for example, MOSFETs. The frequency of the switching is controlled by a switch control signal Q. Signal Q is inverted by an inverter 208. In the example, wherein switches 205 and 207 are MOSFETs, the switch control signal Q is produced by a pulse-width modulator (PWM), not shown, and the signal Q is transmitted to the gate of the MOSFET corresponding to switch 205 and inverse of Q is transmitted to gate 207, thereby alternating between turning on and off the MOSFETs. The inverting network 203 has two output terminals 209 and 211. When Q is high (logic one), switch 205 is closed and switch 207 is open, thereby producing a voltage between terminals 209 and 211. When Q is low (logic zero), switch 205 is open and switch 207 is closed, thereby providing a direct connection between terminals 209 and 211. The latter condition causes a zero voltage between terminals 209 and 211.

Figure 2B:
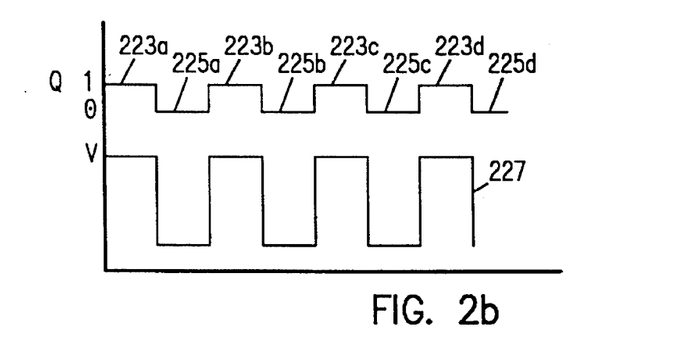
FIG. 2(b) is a waveform of a voltage produced by an inverter circuit.

During high current load, the frequency of high Q pulses is held high. FIG. 2(b) is a graph of the waveform for the switch control signal Q during high current load. In the illustration of FIG. 2(b), high Q (logic one) is represented by pulses 223a through 223d. The spaces 225a through 225d represent low Q (logic zero).

Returning to FIG. 2(a), the inverter network 203 is connected to a low-pass filter 213. The low pass filter 213 consists of an inductor 215 and a capacitor 217. The terminal 209 is connected to the inductor 215, which in turn is connected to the capacitor 217. The terminal 211 is also connected to the capacitor 217. The output voltage from the low-pass filter 213 is available through terminals 219 and 221. The terminal 219 is connected to the low pass filter between the inductor 215 and the capacitor 217 and terminal 221 is connected to the low-pass filter 213 between the capacitor 217 and the terminal 211.

Figure 2C:
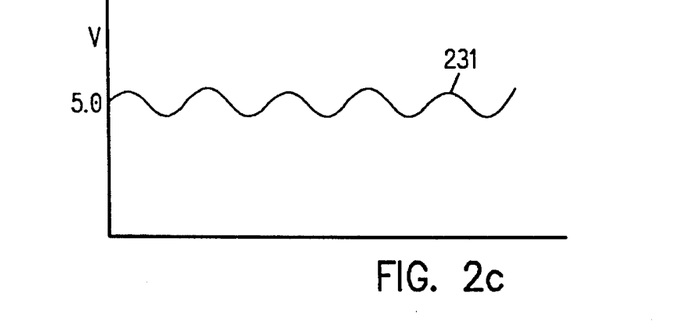
FIG. 2(c) is a waveform of a voltage filtered by a low-pass filter.

During high Q, the voltage between terminals 209 and 211 causes the capacitor 217 to charge up. During low Q, the capacitor 217 discharges. The resulting voltage between terminals 219 and 221 ($V_{out}$) is illustrated in FIG. 2(c) as waveform 231. FIG. 2(c) is a graph illustrating the voltage output from the dc-dc power converter 200 during continuous mode of operation. During continuous mode of operation, the voltage wave form remains relatively smooth and constant, e.g., close to 5.0 volts as illustrated by the waveform 231.

Had the inverter network 203 not been connected to the low-pass filter 213, then the waveform for the voltage between terminals 209 and 211 would have a shape similar to the waveform for Q, shown in FIG. 2(b) as waveform 227.

Figure 3:
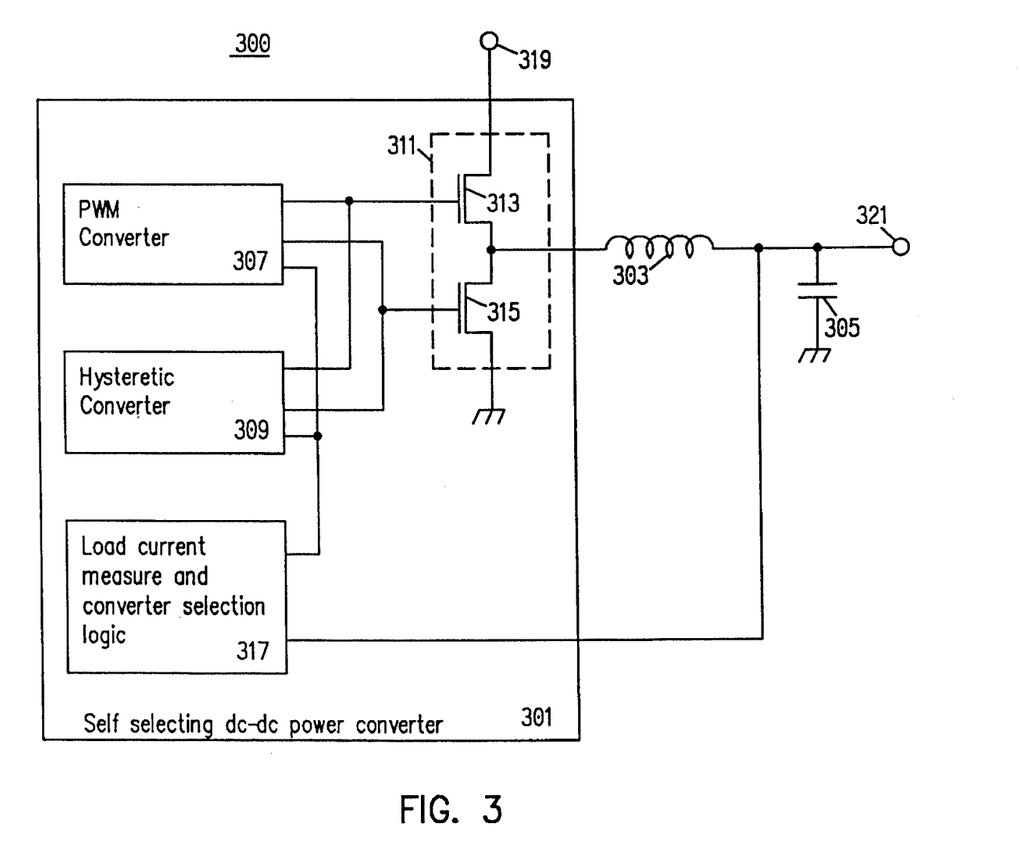
FIG. 3 is a block diagram of a power converter according to the present invention.

FIG. 3 is a block diagram of a power converter 300 according to the present invention. The power converter 300 converts an input voltage $V_{in}$ on input terminal 319 to an output voltage $V_{out}$ on output terminal 321 and consists of a self selecting dc-dc power converter 301 connected to a low-pass filter composed of inductor 303 and capacitor 305. The self selecting dc-dc converter contains a pulse-width modulator (PWM) circuit 307 and a hysteretic comparator circuit 309. The self selecting dc-dc converter 301 uses the PWM circuit 307 during high current loads and the hysteretic comparator circuit 309 during low loads. The PWM circuit 307 and hysteretic comparator circuit 309, respectively, drive a switching network 311 composed of MOSFET transistors 313 and 315. The output from the switching network 311 is connected to the low-pass filter of inductor 303 and capacitor 305.

Self selecting dc-dc power converter 301 is further composed of a load current measure and converter selection logic circuit 317, which is attached to both PWM switch control circuit 307 and to hysteretic comparator switch control circuit 309. The load measure circuit and circuit selection circuit 317 measures the current load on the output terminal 321 and is operable to select either PWM converter 307 or hysteretic circuit 309. During high current loads, the load measure circuit and circuit selection logic circuit 317 selects the PWM converter 307 and during low loads the load measure and converter selection logic circuit 317 selects the hysteretic circuit 309. When the hysteretic circuit is used, the PWM circuit 307 is completely shut down and the hysteretic circuit 309 provides all of the control signals to the gates of MOSFETs 313 and 315. The manner in which the load current measure and converter selection logic circuit 317 selects between the PWM circuit 307 and the hysteretic circuit 309 is described in greater detail below in conjunction with FIGS. 4 through 6.

Figure 4:
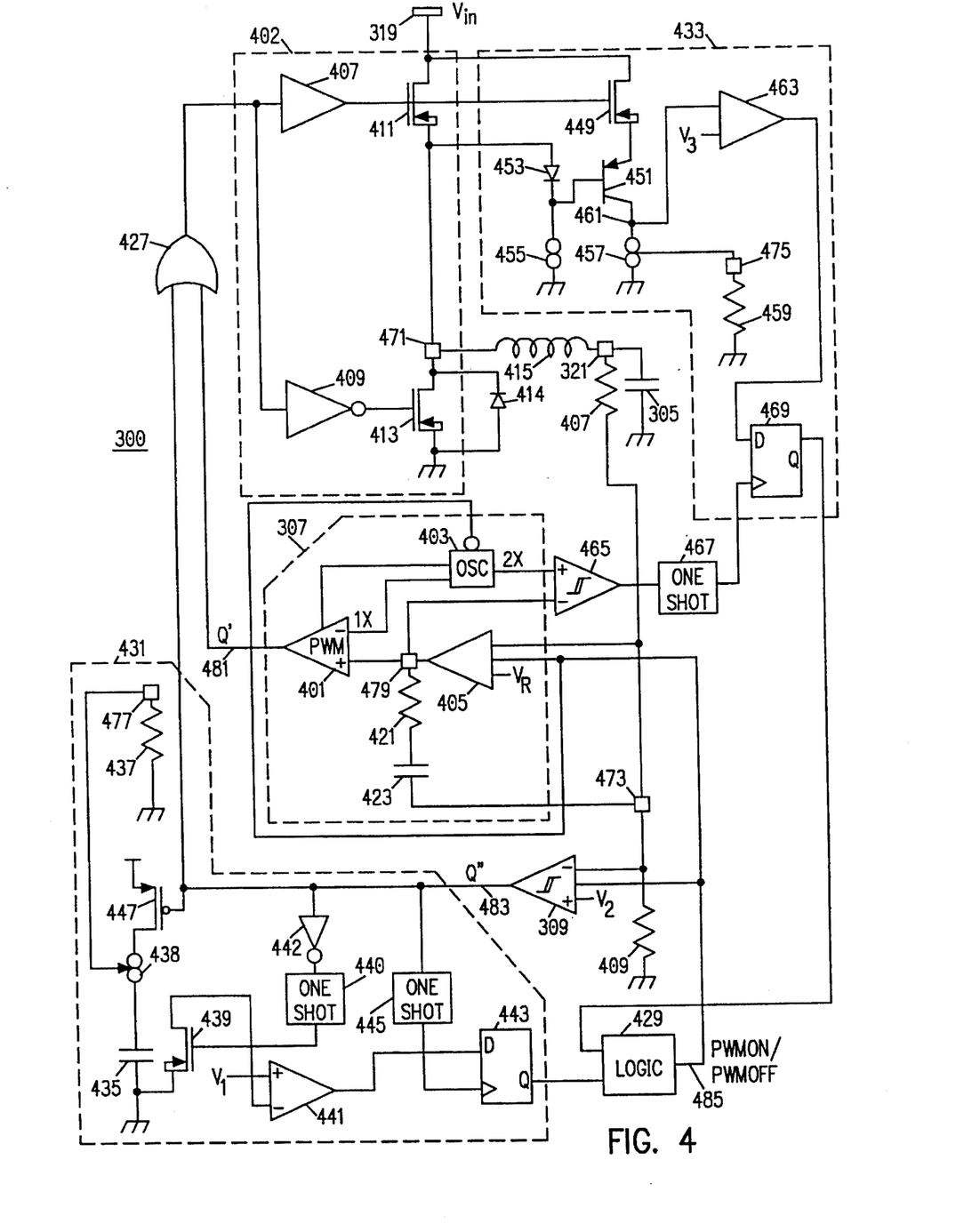
FIG. 4 is a schematic of a power converter according to the present invention.

FIG. 4 is a schematic of an embodiment of a power converter 300 according to the present invention. The input power, i.e., the power from the battery 113, provided through connection 115 of FIG. 1, is provided to the power converter 300 through terminal 319 and the output voltage is made available, i.e., to the central processing unit 101, through terminal 321.

As discussed in above in conjunction with FIG. 3, one embodiment of a power converter according to the present invention consists of a PWM circuit, a hysteretic circuit, and current load sensing circuitry. In the schematic of FIG. 4, the PWM circuit 307 consists of pulse-width modulator 401, which is driven by oscillator 403 and an error amp 405. The inverted input to the PWM 401 is a saw-tooth voltage waveform from the oscillator 403. The non-inverted input to the PWM is the output from the error amp 405. An output line 481 from the PWM circuit is connected by means of an or-gate 427 to the inverter network and carries a Q' signal.

The PWM circuit 307 drives an inverter circuit 402, which consists of gate drives 407 and 409 connected to the gates of MOSFETs 411 and 413, respectively. A logic high of the Q' signal on the line 481 from the PWM 401, transmitted through the gate drive 407, causes the MOSFET 411 to turn on, thereby allowing current to pass from terminal 319 to the low pass filter, which is composed of inductor 415 and capacitor 417. A logic low from the PWM 401, transmitted and inverted by gate drive 409, causes MOSFET 413 to ground the low pass filter to a ground connection 419. The MOSFET 413 is connected in parallel with a rectifying diode 414. The MOSFET 413 lowers the power dissipation in the diode 414.

The error amp 405 compares the output voltage, as divided by resistors 407 and 409, to a reference voltage, $V_r$. In one embodiment, the reference voltage is set to 1.25 volts, which is the natural bandgap voltage of silicon. The resistors 407 and 409 are selected so that the output voltage $V_{out}$ can be compared with the reference voltage $V_r$. The error amp 405 outputs a signal which controls whether the PWM 401 outputs a Q' high or a Q' low. If the error amp 405 senses that $V_{out}$ is lower than the reference voltage $V_r$, then the error amp 405 outputs a signal to the PWM 401 to turn on the power MOSFET 411. Thus, if $V_{out}$ drops below $V_r$, the duty cycle of the inverter network 402 is increased. If the error amp 405 senses that $V_{out}$ is higher than the reference voltage $V_r$, then the error amp 405 outputs a signal to the PWM 401 to turn off the power MOSFET 411, thereby reducing the duty cycle of the inverter circuit 402.

The PWM circuit 307 further consists of a resistor 421 and a capacitor 423. The resistor 421 is connected between the output of error amp 405 and the non-inverted input of PWM 401. The resistor 421 is connected to a capacitor 423, which is connected to pin 473 located between resistors 407 and 409. The resistor 421 in conjunction with the capacitor 423 provides compensation of the error amp 405.

The power supply 300 further consists of a hysteretic switch control circuit 309. The hysteretic switch control circuit 309 may be a hysteretic comparator. The hysteretic circuit 309, in conjunction with the inverter network 402, is a variable frequency dc-dc power controller. The hysteretic circuit 309 has an output line 483, which it uses to transmit a Q" signal and which is connected to the inverter network 402 via the or-gate 427.

The hysteretic switch control circuit 309 allows the output voltage, as divided by resistors 407 and 409, to fluctuate between an upper threshold and a lower threshold, for example, 5V±25 mV. This comparison is made with reference to a reference voltage $V_2$, which is connected to the non-inverted input of the hysteretic circuit 309. When the hysteretic circuit 309 senses that the divided output voltage has dropped below the lower threshold, the hysteretic circuit 309, outputs a Q" high to the inverter network 402, which then operates as discussed above in conjunction with the PWM circuit 307. When the hysteretic converter senses that the divided output voltage has risen above the upper threshold, it sends a Q" low to the inverter network 402, thereby allowing capacitor 305 to discharge.

The PWM switch control circuit 307 and the hysteretic switch control circuit 309 do not operate simultaneously. The PWM circuit 307 is used during high current load and the hysteretic circuit 309 is used during low current load. The output line 481 from the PWM circuit 307 and the output line 483 from the hysteretic circuit 309 are connected to the inputs of the or-gate 427. An output signal Q from the or-gate 427 is transmitted to the input of the inverter network 402.

The PWM switch control circuit is turned on and off by a PWMON signal from a control logic module 429. The PWMON signal is provided to the PWM circuit 307 as a control signal into the error amp 405 and into the oscillator 403. When the error amp 405 senses a high PWMON signal, the error amp 405 becomes active. Furthermore, a high PWMON signal turns on the oscillator 403, thereby activating the PWM 401. When the PWMON signal is low, the error amp 405 is inactive and the oscillator 403 is turned off, thereby providing no signal to the PWM 401.

The PWMON signal output from control logic 429 is connected as a third input to the hysteretic circuit 309. When the PWMON signal is low, the hysteretic circuit 309 is activated, and when the PWMON signal is high, the hysteretic converter is deactivated. A high PWMON signal corresponds to a high current load and a low PWMON signal corresponds to a low current load. During low current load, the power converter 300 goes into sleep mode, which entails turning off the PWM circuit 307 and turning on the hysteretic circuit 309.

The control logic 429 obtains input from a sleep-out circuitry 431 and a sleep-in circuitry 433. The combination of the sleep-out circuitry 431, the sleep-in circuitry 433, and the control logic 429 is equivalent to the load current measure and converter selection logic 317 of FIG. 3. When the sleep-out circuitry 431 detects that the current load has increased beyond a sleep-out threshold, the sleep-out circuitry 431 provides the control logic 429 with a logic high signal. This logic high signal indicates to the control logic 429 to turn the PWMON high at the next available instance. The control logic 429 does not instantaneously change the PWMON signal from low to high, or vice versa, because doing so can interrupt the operation of either the hysteretic circuit 309 or the PWM circuit 307.

The sleep-out circuitry measures the duration of the off-time between high pulses from the hysteretic circuit 309 to the inverter network 402 by comparing the discharge voltage of a capacitor 435 to a reference voltage $V_1$.

Figure 5A:
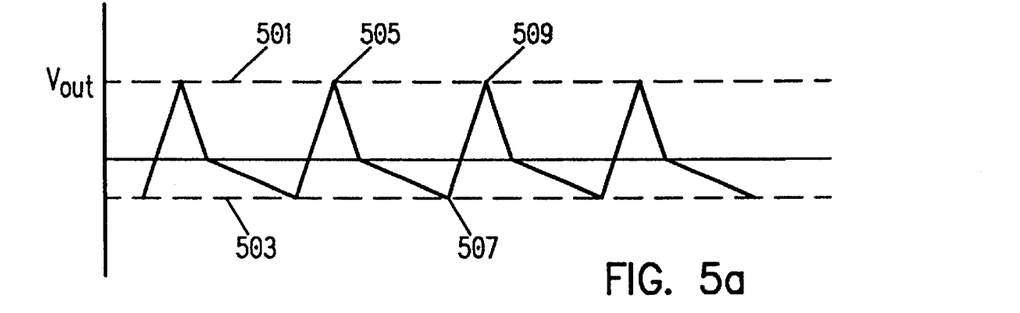
FIG. 5(a) is a graph illustrating a waveform of the sleep mode output voltage from a dc-dc converter according to the present invention.

FIG. 5(a) is a graph illustrating a waveform of the output voltage from the dc-dc controller 300 during sleep mode, i.e., while the hysteretic circuit 309 is in operation. The vertical axis in the graph of FIG. 5(a) represents the output voltage, $V_{out}$, at terminal 321 of FIGS. 3 and 4, and the horizontal axis represents time. Dashed line 501 represents the upper threshold voltage and dashed line 503 represents the lower threshold voltage.

Figure 5B:
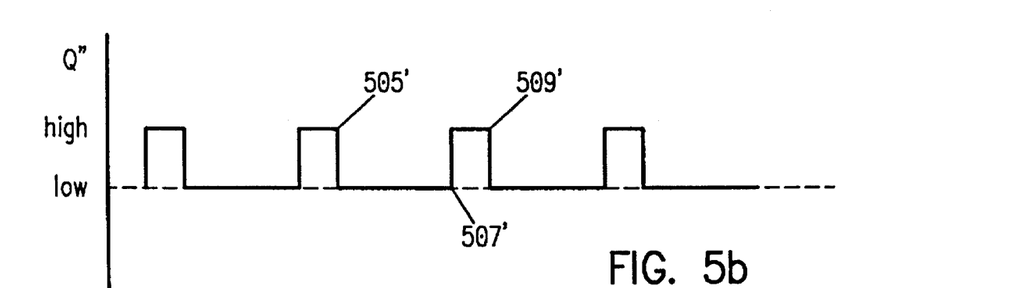
FIG. 5(b) is a graph illustrating a waveform of the output signal of the hysteretic converter of the present invention.

FIG. 5(b) is a graph illustrating a waveform for the output signal Q" from the hysteretic converter. The vertical axis represents the logic state of the signal and the horizontal axis represents time.

When the hysteretic circuit 309 senses that the output voltage $V_{out}$ is greater than or equal to the upper threshold voltage 501, as indicated at time 505, it sends a logic low to the inverter network 402, thereby causing the capacitor 305 to discharge. The capacitor 305 is allowed to discharge until the hysteretic converter 309 senses that the voltage is less than or equal to the lower threshold voltage 503, as indicated at time 507. The graph section between points 505 and 507 represents the time during which capacitor 305 is allowed to discharge. When the voltage has dropped to or below the lower threshold voltage 503, the hysteretic circuit 309 sends a Q" high signal to the inverter network, as is shown in FIG.

5(b) at time 507'. The hysteretic circuit 309 holds the Q" signal high until the output voltage is again at or above the threshold voltage 501, as indicated at time 509. At that time, the hysteretic circuit 309 lowers the Q" signal, as is indicated in FIG. 5(b) at time 509'.

The frequency of the hysteresis is a good indicator of the current load. To measure the frequency of the hysteresis, the sleep out circuitry 431 allows a capacitor 435 to charge up during the period of time during which Q" is held low. The capacitor 435 is connected to a current source 438, which provides the current to charge the capacitor 435. The rate at which the capacitor 435 is allowed to recharge is adjusted by a sleep out adjustment resistor 437. The capacitor 435 is allowed to discharge through a MOSFET 439. The MOSFET 439 is turned on when Q" is lowered by hysteretic comparator, e.g., as shown in FIG. 5(b) at time 505'. The MOSFET 439 is turned on by a one shot 440, which is connected to the gate of MOSFET 439. The input to the one shot 440 is connected to an inverter 442, which is connected to the output line 483, thereby receiving the Q" signal output from the hysteretic circuit 309. Thus, when Q" is lowered, the inverter 442 inverts the Q" signal and provides this inverted signal, to the one shot 440. The one shot 440 is positive edge triggered and on receiving the positive edge of the inverted Q" signal provides sufficient gate voltage to the MOSFET 439 so as to allow current to pass through the MOSFET 439, thereby very quickly discharging the capacitor.

Figure 5C:
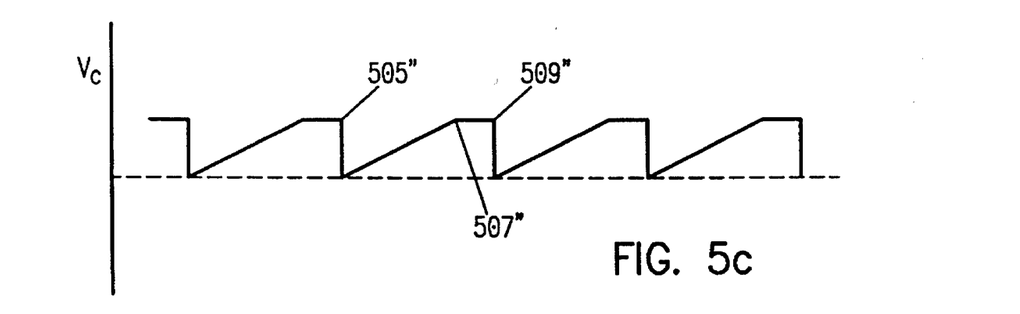
FIG. 5(c) is a graph illustrating a waveform of the voltage across the sensing capacitor used by the present invention.

FIG. 5(c) is a graph illustrating the waveform of voltage across the capacitor 435. At time 505", which corresponds to time 505' in FIG. 5(b), in response to lowering the Q" signal at time 505', the voltage across the capacitor drops very quickly, as is indicated at time 505". Between time 505' and time 509', the capacitor is allowed to charge back up. During the time between 505' and 509', no gate voltage is applied to the MOSFET 439. Therefore, the output current from the current source 438 charges up the capacitor 435.

The amount of current produced by the current source 438 is controlled by the sleep out adjustment resistor 437. The sleep out adjustment resistor 437 is connected to a pin 477, which in turn is connected to the current source 438. A voltage is applied to pin 477, e.g., 1.25 volts. This voltage produces a current through the sleep out adjustment resistor 437. The current source 438 mirrors this current, i.e., the current source 438 produces substantially the same amount of current as the amount of current which is transmitted through the sleep out adjustment resistor 437.

The current source 438 is also connected to a MOSFET 447. The MOSFET 447 acts as a switch for the current source 438. The gate of the MOSFET 447 is connected to the output line 483 of the hysteretic circuit 309. The signal Q", which is carried by the output line 483, is inverted before it enters the gate of the MOSFET 447. Thus, when Q" is low, the MOSFET 447 is turned on, which in turn turns on the current source 438. Therefore, between times 505" and 507", the capacitor 435 is charged. Conversely, when Q" is high, as between times 507' and 509', the MOSFET 447 is turned off, which in turn turns off the current source 438. This causes the charge on the capacitor 435 to remain constant while Q" is high, as is indicated in FIG. 5(c) between times 507" and 509".

The voltage across capacitor 435 is constantly monitored by voltage comparator 441. The voltage across capacitor 435 is compared by voltage comparator 441 with a reference voltage, $V_1$. In one embodiment of the invention, $V_1$ is set to 2.0 volts. The output of comparator 441 is connected to the D terminal of a D-flip-flop 443. The output from the comparator 441 is indicative of whether the voltage $V_c$ across the capacitor 435 is lower than or higher than the reference voltage, $V_1$, e.g., if $V_c$ is higher than $V_1$, the output from the comparator 441 is set to a logic 1, and if $V_c$ is lower than $V_1$, the output from the comparator 441 is set to logic 0. The clock input of the D-flip-flop 443 is connected via a one shot 445 to the output line 483 and thus obtains the Q" signal output by the hysteretic circuit 309. The one shot 445 is triggered by a positive edge on its input. Thus, on the rising edge of Q", as indicated at time 507' in FIG. 5(b), the output from the comparator 441 is docked into the D-flip-flop 443. Because the output from the comparator 441 is a continuous comparison of the voltage $V_c$ across the capacitor 435, with the reference voltage $V_1$, the clocking by the one shot 445 of the output of the comparator 441 into the D-flip-flop 443 causes D-flip-flop 443 to store a measure of the voltage $V_c$ across the capacitor 435 at the time of the rising edge of the Q" signal output from the hysteretic circuit 309. The voltage measure clocked into the D-flip-flop 443 is indicative of the frequency of hysteresis, because the time between 505" and 507" can be derived from the following relationship:

$$I = C \frac{dv}{dt} \quad (1)$$

Because the current produced by the current source 438 is controlled by the sleep out adjustment resistor 437, the current I, which is applied to the capacitor 435, is known and can be adjusted by changing the resistance through the adjustment resistor 437. The capacitance, C, is known for the capacitor 435. The change in voltage, dv, is determined by the comparator 441. Because I, C and dv are known, dt, the charge-up time for the capacitor 435, can be determined from equation (1). A short dt is indicative of a high current load, and vice versa. The output from the D-flip-flop 443 indicates whether dt is sufficiently short to be considered indicative of a high current load.

The control logic 429 also obtains input from the sleep-in circuit 433. The sleep-in circuit 433 monitors the current load during PWM mode. The sleep-in circuit 433 consists of a sensing transistor 449, whose drain is connected to the drain of the power MOSFET 411. Thus, the sensing transistor is connected in parallel with the power MOSFET 411. The sensing transistor 449 is sized to carry 1/1000th of the current through the power MOSFET 411. The sensing transistor 449 is a mirror of the power MOSFET 411 in the sense that it carries a current that is proportional to the current through the power MOSFET 411. Thus, by monitoring the current through the sensing transistor, it is possible to determine the current load on the power MOSFET 411.

The drain of the sensing transistor 449 is connected to the collector of a PNP transistor 451. The anode of a diode 453 is connected to the source of the power MOSFET 411. The cathode of the diode 453 is connected to the base of the PNP transistor 451. The cathode of the diode 453 is also connected to a current source 455, which in turn is connected to ground. The emitter of the PNP transistor 451 is connected to a current source 457, which in turn is connected to ground. The output current from the current source 457 is adjusted by way of a sleep-in resistor 459. The current produced by the current source 457 competes with the current that is transmitted through the sensing transistor 449 and through the PNP transistor 451. The current transmitted through the sensing transistor 449 is compared to the current from the current source 457, as controlled by the sleep-in adjustment resistor 459, by comparing the voltage at a connection point 461 on the line connecting the emitter of the PNP transistor with the current source 457 against a reference voltage $V_3$. The PNP transistor 451 and the diode 453 act as a voltage buffer, ensuring that the voltage on the connection point 461 remains constant while the power MOSFET 411 is turned on. The connection point 461 is connected to a comparator 463. The second input of the comparator 463 is connected to the reference voltage $V_3$. When the current through the sensing transistor 449 and through the PNP transistor 451 decreases, the voltage at connection point 461 decreases. When the voltage at the connection point 461 has dropped below the $V_3$ voltage, the comparator 463 changes state from logic 1 to logic 0.

The amount of current produced by the current source 457 is controlled by the sleep in adjustment resistor 459. The sleep in adjustment resistor 459 is connected to a pin 475, which in turn is connected to the current source 457. A voltage is applied to pin 475, e.g., 1.25 volts. This voltage produces a current through the sleep in adjustment resistor 459. The current source 457 mirrors this current, i.e., the current source 457 produces substantially the same amount of current as the amount of current which is transmitted through the sleep in adjustment resistor 459.

Figure 6A:
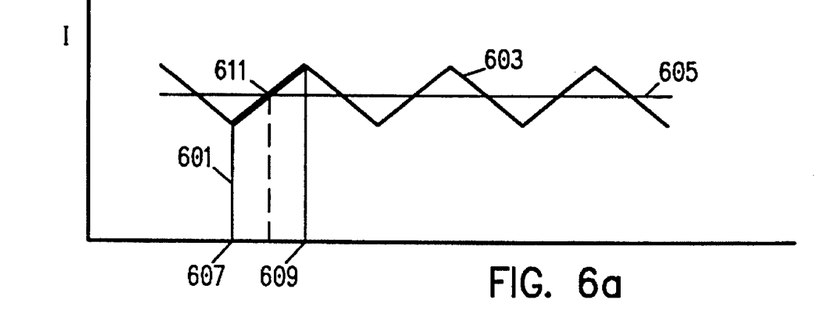
FIG. 6(a) is a graph illustrating the current load on a dc-dc converter, the average current load on a dc-dc converter, and one on-pulse of a PWM used by the dc-dc converter according to the present invention.

The output from the comparator 463 is sampled at the middle of the on cycle of the power MOSFET 411. FIG. 6(a) is a graph showing the instantaneous switch current (indicated by a pulse 601), the load current on the power MOSFET 411 (indicated by a plot 603), and the average load current (indicated by a line 605). One pulse of on time of the power MOSFET 411 occurs between times 607 and 609. The average load current intersects the load current in the middle of the pulse 601, at time 611. Therefore, the load current, as measured by the comparator 463, is sampled at the middle of the on time of the power MOSFET 411.

Figure 6B:
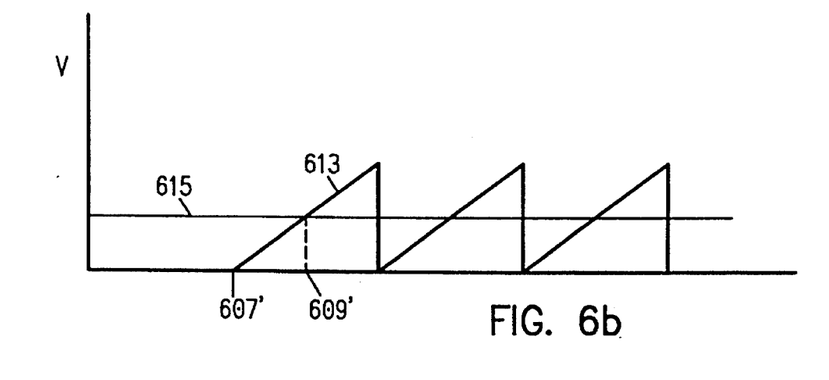
FIG. 6(b) is a waveform for the oscillator ramp according to the present invention.

The middle of the on time of the power MOSFET 411 is determined by comparing a doubling of the oscillator ramp of oscillator 403 to the error amp voltage of error amp 405. FIG. 6(b) is a graph illustrating the oscillator ramp of oscillator 403 (indicated by saw tooth 613) and the error amp voltage of error amp 405 (as indicated by line 615). The power MOSFET 411 is turned on at the beginning of the oscillator ramp, at time 607'. The power MOSFET 411 is turned off when the oscillator ramp 613 intersects the error amp voltage 615, as indicated at time 609'.

Figure 6C:
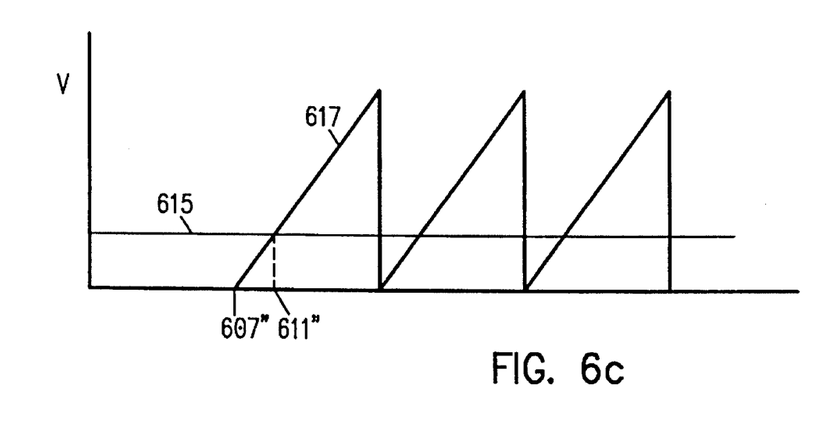
FIG. 6(c) is a waveform for a doubled oscillator ramp according to the present invention.

Returning to FIG. 4, the oscillator 403 has a second output with a doubling of the oscillator ramp, i.e., the oscillator ramp of the second output of oscillator 403 is double the oscillator ramp of the oscillator output that is connected to the PWM 465. The second output of oscillator 403 is connected to a PWM 465. FIG. 6(c) is a graphical illustration of the doubled ramp output of the oscillator 403 (indicated as sawtooth 617). The sawtooth 617 has twice as steep a slope as the sawtooth 613 of FIG. 6(b). FIG. 6(c) also contains a plot of the error amp voltage 615. The error amp voltage 615 is the same in FIG. 6(b) and in FIG. 6(c). The doubled ramp oscillator output 617 intersects the error amp voltage 615 at time 611", which is half-way between times 607 and 609 of FIG. 6(a). The PWM 465 outputs a logic high signal when the doubled oscillator ramp 617 is greater than the error amp voltage 615. The output from PWM 465 is connected to a positive edge triggered one shot 467, whose output is connected to the clock input of a D-flip-flop 469. The output from the comparator 463 is connected to the D input of the D-flip-flop 469. Thus, when the PWM 465 detects that the doubled oscillator ramp 617 is greater than the error amp voltage 615, the output of the comparator 463 is clocked into the D-flip-flop 469.

The Q outputs of the D-flip-flops 443 and 469 are both connected to the control logic 429. The control logic 429 has an output signal PWMON/PWMOFF, which is transmitted to the hysteretic switch control circuit 309 and the PWM switch control circuit 307 on line 485. The control logic 429 maintains status information on whether the dc-dc converter 300 is operating in PWM mode or in hysteretic mode. If PWM mode, the control logic 429 monitors the Q output from the D-flip-flop 443. If the Q output of the D-flip-flop 443 becomes low during PWM mode, the control logic 429 turns the PWMON/PWMOFF signal to low, thereby turning off the PWM circuit 307 and turning on the hysteretic circuit 309.

If in hysteretic mode, the control logic 429 monitors the Q output from the D-flip-flop 469. If the Q output of the D-flip-flop 469 becomes low during hysteretic mode, the control logic 429 turns the PWMON/PWMOFF signal high, thereby turning on the PWM circuit 307 and turning off the hysteretic converter 309.

The control logic 429 contains delays so that transitions from PWM mode to hysteretic mode are only executed at appropriate times. For example, the control logic 429 prevents excessive switching between hysteretic mode and PWM mode by only allowing switching after the dc-dc power converter 300 has remained in one mode for a certain amount of time, e.g., for at least 1 msec.

In one embodiment, the dc-dc converter 300 is implemented primarily in one module, e.g., as one integrated circuit. In this embodiment, certain elements of the dc-dc converter 300 may be placed outside of the main module. In the embodiment illustrated in FIG. 4, the connections between internal and external elements are indicated by terminals 319 and 321, and pins 471, 473, 475, 477, and 479. Pins 471 and 473 provide means for connecting the inductor 415 to the circuit between the power MOSFET 411 and the capacitor 417. Pin 475 provides a means for connecting the sleep in adjustment resistor 459 to the current source 457. Pin 477 provides a means for connecting the sleep out resistor 437 to the current source 438. Pin 479 provides a connection for resistor 421 to the line between the error amp 405 and the non-inverted input of PWM 401.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. For example, switches implemented using MOSFETs may be implemented using other switching technologies, e.g., JFETs, bi-polar transistors. A person skilled in the art will realize that where a PNP transistor is used, a restructuring of the circuit will allow the use of an NPN transistor. A person skilled in the art will also realize that where a hysteretic converter is used for low current load situations, other dc-dc converters, which are suitable during low current loads, may be used. Similarly, a person skilled in the art will realize alternatives to the PWM circuit. Elements described as internal parts may be implemented as external parts, and vice versa. It is, therefore, contemplated that the appended claims will cover such modifications that fall within the true scope of the invention.

We claim:

1. A power saving dc-dc converter, comprising:

a first switch control circuit;

a second switch control circuit;

a first current sensor connected to said first switch control circuit;

a second current sensor connected to said second switch control circuit; and control logic connected to said first current sensor and to said second current sensor and operable to enable and disable said first and second switch control circuits;

wherein said first switch control circuit uses less power than said second switch control circuit, and wherein said first switch control circuit is enabled during low current load and said second switch control circuit is enabled during high current load.

2. The power saving dc-dc converter of claim 1, wherein said first switch control circuit is a PWM circuit.

3. The power saving dc-dc converter of claim 1, wherein said second switch control circuit is a hysteretic comparator circuit.

4. The power saving dc-dc converter of claim 1, further comprising a first power switch connected to said first switch control circuit and to said second switch control circuit.

5. The power saving dc-dc converter of claim 1, wherein said first power switch is a MOSFET.

6. The power saving dc-dc converter of claim 4, wherein said first switch control circuit is operable to alternately turn on and turn off said first power switch.

7. The power saving dc-dc converter of claim 6, wherein said first switch control circuit alternately produces an output signal having a first state and a second state, and wherein said first current sensor comprises:

a current source connected to and controlled by said first switch control circuit;

a capacitor connected to said current source, wherein said capacitor is charged during the periods when said output signal is in said first state;

a transistor connected to said capacitor and to said first switch control circuit, and operable to discharge said capacitor when said output signal transitions from said first state to said second state;

a voltage comparator connected to said capacitor and operable to compare a voltage across said capacitor to a reference voltage; and a storage unit having a data input connected to said voltage comparator and a clock input connected to said first switch control circuit, wherein a value on said data input is clocked into said storage unit when said output signal has a transition from said first state to said second state.

8. The power saving dc-dc converter of claim 7, wherein said first current sensor further comprises a sleep out adjustment resistor connected to said current source, wherein the current produced by said current source is controlled by said sleep out adjustment resistor.

9. The power saving dc-dc converter of claim 4, wherein said second switch control circuit is operable to alternately turn on and turn off said first power switch.

10. The power saving dc-dc converter of claim 9, wherein said second switch control circuit further comprises:

a switch controller connected to said first power switch; and an oscillator having a first output connected to said switch controller and a second output, said first output having a first oscillator ramp and said second output having a second oscillator ramp, wherein the second oscillator ramp is more steep than the first oscillator ramp.

11. The power saving dc-dc converter of claim 10, wherein said second current sensor further comprises:

a sensing transistor connected in parallel to said first power switch, wherein said sensing transistor is sized to carry a fraction of the current carried by said power switch.

12. The power saving dc-dc converter of claim 11, wherein said second current sensor further comprises:

a current source connected to said sensing transistor and operable to produce a current which competes with said current carried by said sensing transistor, thereby producing a voltage indicative of the relative strength of said current carried by said sensing transistor and said current produced by said current source.

13. The power saving dc-dc converter of claim 12, wherein said second current sensor further comprises:

a sleep in adjustment resistor connected to said current source wherein said current produced by said current source is controlled by said sleep in adjustment resistor.

14. The power saving dc-dc converter of claim 11, wherein second current sensor further comprises:

a voltage comparator connected to said connection between said first power switch and said current source, and connected to a reference voltage, wherein said voltage comparator is operable to compare said voltage indicative of the relative strengths of said current carried by said sensing transistor and said current produced by said current source to said reference voltage.

15. The power saving dc-dc converter of claim 14, wherein said second current sensor further comprises:

a storage unit having a data input and a clock input, said data input being connected to said voltage comparator.

16. The power saving dc-dc converter of claim 15, further comprising:

an error amp connected to said first pwm and having an output voltage;

a second pwm connected to said second output of said oscillator, said second voltage comparator, and connected to said clock input of said storage unit, and operable to cause a value on said data input to be clocked into said storage unit when said second oscillator ramp intersects said output voltage.

17. A dual-mode power supply for a battery operated device having a first mode of operation for use during low current load and a second mode of operation for use during high current load, the dual-mode power supply comprising:

a first power MOSFET having a gate, a drain and a source wherein a voltage applied to said gate causes current to pass from said drain to said source;

a low-pass filter including an inductor connected to said power MOSFET and a capacitor connected to said inductor;

a PWM switch control circuit connected to said first power MOSFET and including:
a PWM connected to said power MOSFET and operable to switch said power MOSFET between an on state and an off state; and
an error amplifier connected to said PWM and operable to compare a voltage output from said low-pass filter to a reference voltage, said error amplifier being operable to control said PWM such that the voltage output from said low-pass filter is substantially equal to said reference voltage;

a hysteretic switch control circuit connected to said power MOSFET such that the output voltage from said low-pass filter remains within a predefined voltage range;

a sleep-out circuit connected to said hysteretic switch control circuit for determining whether the current load exceeds a threshold for deactivating said hysteretic switch control circuit and reactivating said PWM switch control circuit;

a sleep-in circuit connected to said PWM switch control circuit for determining whether the current load is lower than a threshold for deactivating said PWM switch control circuit and reactivating said hysteretic switch control circuit; and control logic connected to said sleep-out circuit, to said sleep-in circuit, to said PWM switch control circuit and to said hysteretic switch control circuit, said control logic being operable to turn on said PWM switch control circuit during high current load and operable to turn off said PWM switch control circuit during low current load, said control logic being operable to turn on said hysteretic switch control circuit during low current load and operable to turn off said hysteretic switch control circuit during high current load.

18. The dual-mode power supply for a battery operated device of claim 17, further comprising:

a sleep-out adjustment resistor connected to said sleep-out circuit and operable to adjust said threshold for deactivating said hysteretic switch control circuit.

19. The dual mode power supply for a battery operated device of claim 17, further comprising:

a sleep-in adjustment resistor connected to said sleep-in circuit and operable to adjust said threshold for deactivating said PWM switch control circuit.

20. A portable battery operated system, comprising:

a processing unit;

a battery; and a first dual mode power supply connected to receive power from said battery, and connected to provide power to said processing unit, said dual-mode power supply including a switch connected to a low pass filter;

a first switch control circuit connected to said switch and operable to control the switching of said switch during high current load;

a second switch control circuit connected to said switch and operable to control the switching of said switch during low current load;

a first current sensing circuit connected to said first switch control circuit and operable to detect current load while said first switch control circuit is in operation;

a second current sensing circuit connected to said second switch control circuit and operable to detect current load while said second switch control circuit is in operation;

control logic connected to said first current sensing circuit, to said second current sensing circuit, to said first switch control circuit, and connected to said second switch control circuit and operable to cause said first switch control circuit to become deactivated during low current loads, operable to cause said second switch control circuit to become active during low current loads, operable to cause said first switch control circuit to become active during high current loads, and operable to cause said second switch control circuit to become deactivated during low current loads.

21. The portable battery operated system of claim 20, wherein said switch is a power MOSFET.

22. The portable battery operated system of claim 20, wherein said first switch control circuit is a PWM circuit.

23. The portable battery operated system of claim 20, wherein said second switch control circuit is a hysteretic circuit.

24. The portable battery operated system of claim 20, wherein said switch is a bi-polar transistor.

25. A circuit for detecting the current load on a PWM converter having a switch, a first PWM connected to the switch, an error amplifier connected to said first PWM, and a low pass filter having an inductor connected to said switch and a capacitor connected to said inductor, the circuit comprising:

a sensing transistor connected in parallel to said switch, said sensing transistor being sized to carry a fraction of the current carried by said switch;

a first current source connected to said sensing transistor and operable to produce a current which competes with the current carried by said sensing transistor thereby producing a voltage indicative of the relative strengths of the current carried by said sensing transistor and the current produced by said first current source;

a comparator connected to a reference voltage and to a point on said connection between said sensing transistor and said first current source, said comparator operable to compare said voltage indicative of said relative strengths of said current carried by said sensing transistor and the current produced by said first current source;

a storage unit having a data input and a clock input, said data input being connected to said comparator;

a second PWM connected to said error amplifier and to said clock input of said storage unit; and an oscillator having a first output connected to said first PWM and having a second output connected to said second PWM, wherein the oscillator ramp of said second output is steeper than the oscillator ramp of said first output;

wherein said second PWM changes state when the oscillator ramp of said second output is greater than or equal to the output of said error amplifier, thereby causing a value on said data input to be clocked into said storage unit.

26. The circuit of claim 25, further comprising:

a buffering transistor connected between said sensing transistor and said first current source; and a diode connected between said switch and said buffering transistor, whereby said buffering transistor and said diode substantially stabilize said voltage indicative of said relative strenghts of said current carried by said sensing transistor and the current produced by said first current source.

27. The circuit of claim 25, further comprising:

a second current source connected to said diode and to a ground connection.

28. The circuit of claim 25, further comprising:

an adjustment resistor connected to said first current source and operable to control the amount of current produced by said first current source.

29. A detection circuit for detecting load on a hysteretic comparator circuit that includes a switch, a hysteretic comparator connected to said switch, and a low pass filter having an inductor connected to said switch and a first capacitor connected to said inductor, the detection circuit comprising:

a first current source connected to said hysteretic comparator;

a second capacitor connected to said first current source;

a voltage comparator connected to a reference voltage and connected to said capacitor, said voltage comparator being operable to compare said reference voltage to the voltage across said capacitor;

a first transistor controlled by said hysteretic comparator and connected in parallel to said second capacitor and operable to cause said second capacitor to discharge upon receipt of a first signal from said hysteretic comparator; and a storage unit having a data input connected to said voltage comparator and having a clock input connected to said hysteretic comparator, wherein a value on said data input is clocked into said storage unit upon receipt of a second signal from said hysteretic comparator.

30. The circuit of claim 29, further comprising:

a second transistor connected between said hysteretic comparator and said current source, said second transistor being operable to control said current source such that said current source does not cause said second capacitor to charge upon receipt of a second signal from said hysteretic converter.

* * * * *